(12) United States Patent
Takahashi et al.

(10) Patent No.: US 12,314,685 B2
(45) Date of Patent: May 27, 2025

(54) ANALYSIS APPARATUS, ANALYSIS METHOD, AND PROGRAM

(71) Applicant: Nippon Telegraph and Telephone Corporation, Tokyo (JP)

(72) Inventors: Kensuke Takahashi, Musashino (JP); Sho Kanemaru, Musashino (JP); Tomoki Ikegaya, Musashino (JP); Tsuyoshi Toyoshima, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 170 days.

(21) Appl. No.: 18/019,964

(22) PCT Filed: Aug. 18, 2020

(86) PCT No.: PCT/JP2020/031080
§ 371 (c)(1),
(2) Date: Feb. 6, 2023

(87) PCT Pub. No.: WO2022/038666
PCT Pub. Date: Feb. 24, 2022

(65) Prior Publication Data
US 2023/0273773 A1  Aug. 31, 2023

(51) Int. Cl.
*G06F 8/10* (2018.01)
(52) U.S. Cl.
CPC ...................... *G06F 8/10* (2013.01)
(58) Field of Classification Search
None
See application file for complete search history.

(56) References Cited

U.S. PATENT DOCUMENTS

| | | | |
|---|---|---|---|
| 2005/0044037 A1* | 2/2005 | Lawrence | G06Q 20/4016 705/38 |
| 2016/0350692 A1* | 12/2016 | Doganata | G06Q 10/06398 |
| 2020/0097870 A1* | 3/2020 | McGinty | G06Q 10/063118 |
| 2020/0349055 A1* | 11/2020 | Reddy | G06F 11/3688 |
| 2022/0405095 A1* | 12/2022 | Zhang | G06F 8/77 |
| 2023/0273773 A1* | 8/2023 | Takahashi | G06Q 10/06 717/101 |

FOREIGN PATENT DOCUMENTS

JP H09248736 9/1997

OTHER PUBLICATIONS

Benomar, "Detection of Software Evolution Phases based on Development Activities", 2015. IEEE (Year: 2015).*

(Continued)

*Primary Examiner* — Hossain M Morshed
(74) *Attorney, Agent, or Firm* — Fish & Richardson P.C.

(57) ABSTRACT

An analyzing device for analyzing a result of a software development team that repeatedly executes a sprint includes an acquisition unit that acquires a commit history from a development repository that stores a product of the software development team, an analysis unit that calculates statistical information by aggregating the commit histories in units of the sprint, and a display unit that displays the statistical information. The analysis unit calculates the Gini coefficient in which a maldistribution of the result of the software development team is considered in the unit of the development cycle.

9 Claims, 12 Drawing Sheets

(56) References Cited

OTHER PUBLICATIONS

Behnamghader, "Towards Better Understanding of Software Quality Evolution Through Commit-Impact Analysis", 2017, IEEE (Year: 2017).*

Masuda, "Team Activities Measurement Method for Open Source Software Development Using the Gini Coefficient", 2019, IEEE (Year: 2019).*

Jinzenji et al., "Productivity evaluation of agile development using VSM and comparison of waterfall development," IPSJ SIG Technical Report, 2019, 2019-SE-203(8):1-7, 15 pages (with English Translation).

Masuda et al., "Team Activities Measurement Method for Open Source Software Development Using the Gini Coefficient," 2019 IEEE International Conference on Software Testing, Verification and Validation Workshops (ICSTW), Apr. 22, 2019, pp. 140-147.

* cited by examiner

| INFORMATION NAME | SUMMARY |
|---|---|
| COMMIT DAY | DATE OF COMMIT |
| COMMIT AUTHOR | NAME OF A PERSON WHO ACTUALLY MODIFIES FILE |
| NUMBER OF MODIFIED FILES | NUMBER OF FILES MODIFIED BY COMMIT |
| NUMBER OF MODIFIED LINES | TOTAL NUMBER OF LINES MODIFIED BY COMMIT |
| NUMBER OF ADDITIONAL LINES | NUMBER OF LINES ADDED BY COMMIT |
| NUMBER OF DELETED LINES | NUMBER OF LINES DELETED BY COMMIT |
| COMMIT MESSAGE | COMMIT MESSAGE ASSIGNED TO COMMIT |

Fig. 3

```
begin, end
2019/04/01, 2019/04/23
2019/04/24, 2019/05/21
2019/05/22, 2019/06/18
2019/06/19, 2019/07/09
2019/07/10, 2019/08/06
2019/08/07, 2019/09/03
2019/09/04, 2019/09/24
2019/09/25, 2019/10/22
2019/10/23, 2019/11/19
2019/11/20, 2019/12/17
2019/12/18, 2020/01/14
2020/01/15, 2020/02/04
2020/02/05, 2020/03/03
2020/03/04, 2020/3/19
```

ANALYSIS APPARATUS, ANALYSIS METHOD, AND PROGRAM

CROSS-REFERENCE TO RELATED APPLICATIONS

This application is a National Stage application under 35 U.S.C. § 371 of International Application No. PCT/JP2020/031080, having an International Filing Date of Aug. 18, 2020.

The disclosure of the prior application is considered part of the disclosure of this application, and is incorporated by reference in its entirety into this application.

TECHNICAL FIELD

The present invention relates to an analyzing device, an analyzing method, and a program.

BACKGROUND ART

In agile software development, the creation of operating software is valuable, and development in a short-term cycle is repeatedly performed, thereby flexibly coping with changing requirements.

CITATION LIST

Non Patent Literature

[NPL 1] JINZENJI et. al., "Productivity evaluation of agile development using VSM and comparison of waterfall development," information Processing Society of Japan, Research Report Software Engineering, 2019-SE-208, pp. 1-7

[NPL 2] Ayako Masuda, et. al., "Thea Activities Measurement Method for Open Source Software Development Using the Gini Coefficient," 2019 IEEE ICSTW.

SUMMARY OF INVENTION

Technical Problem

However, although the productivity and stability of a development team for agile development can be understood by the development team itself as an internal bodily sensation, it is difficult to objectively measure the productivity and stability when viewed from the outside.

In addition, the development team improves the process by looking back (retrospective) at the end of each cycle, but there is a problem that much of this is based on the subjectivity of the developer and there is no objective index.

In order to calculate an objective index of productivity of agile development, there is a problem that a burden on a development member by measurement increases even when project management techniques such as questionnaire using questionnaires, man-months and hours, and test density are strengthened.

In NPL 1, by paying attention to "value," metrics of productivity evaluation based on the concept of a value stream map (VMS) in lean software development are proposed. NPL 1 does not mention analysis of the history of the repository used by the development team that is a productivity evaluation using man-hours as an index.

In NPL 2, the activity of team activities in the large-scale open source software (OSS) project is quantified by calculating the Gini coefficient based on the number of persons and periods involved in the development of OSS. However, the measurement of continuous productivity and stability per sprint in agile development is not disclosed The present invention has been made in view of the above, and an object of the present invention is to enable efficient management of agile development.

Solution to Problem

An analyzing device according to one aspect of the present invention is an analyzing device for analyzing a result of a software development team that repeatedly executes a development cycle and including an acquisition unit that acquires a commit history from a development repository that stores a product of the software development team, an analysis unit that calculates statistical information by aggregating the commit histories in units of the development cycles, and a display unit that displays the statistical information.

An analyzing method according to an aspect of the present invention is an analyzing method for analyzing a result of a software development team that repeatedly executes a development cycle, the method causing a computer to execute acquiring a commit history from a development repository that stores a product of the software development team, calculating statistical information by aggregating the commit histories in units of the development cycles, and displaying the statistical information.

Advantageous Effects of Invention

According to the present invention, efficient management of agile development can be performed.

DESCRIPTION OF EMBODIMENTS

Hereinafter, an analyzing device of an embodiment will be described with reference to the drawings.

Figure 1:
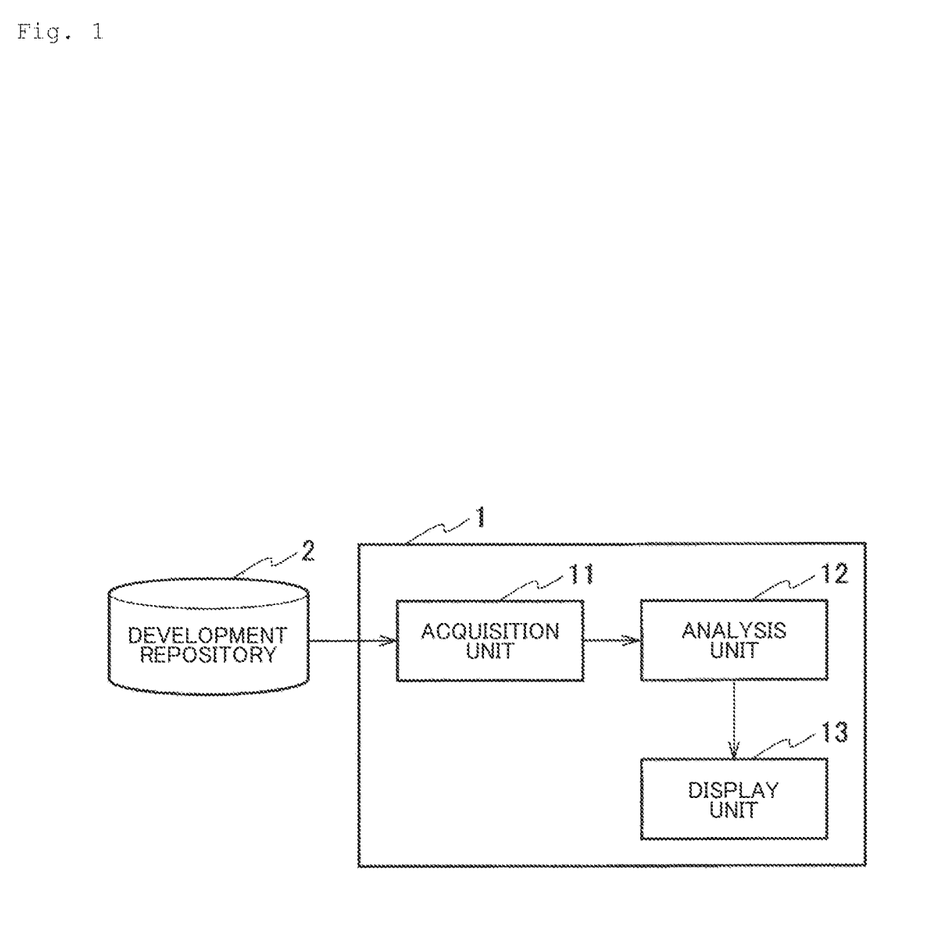
FIG. 1 is a diagram illustrating an example of a configuration of an analyzing device of the present embodiment.

FIG. 1 is a diagram illustrating an example of a configuration of an analyzing device 1. The analyzing device 1 illustrated in the figure includes an acquisition unit 11, an analysis unit 12, and a display unit 13, and analyzes the result of a development team which repeatedly executes the "development cycle" (also referred to as sprint period).

The acquisition unit 11 acquires a commit history from a development repository 2. The development repository 2 is a place where a version management system used for software development stores files such as source codes and documents and various data such as change histories. As the version management system, for example, a system in which a commit history such as Git or SVN remains is used. Commit is to store a file created or modified by the developer in the development repository 2. The commit history is a history of commit of a development team.

Figure 2:
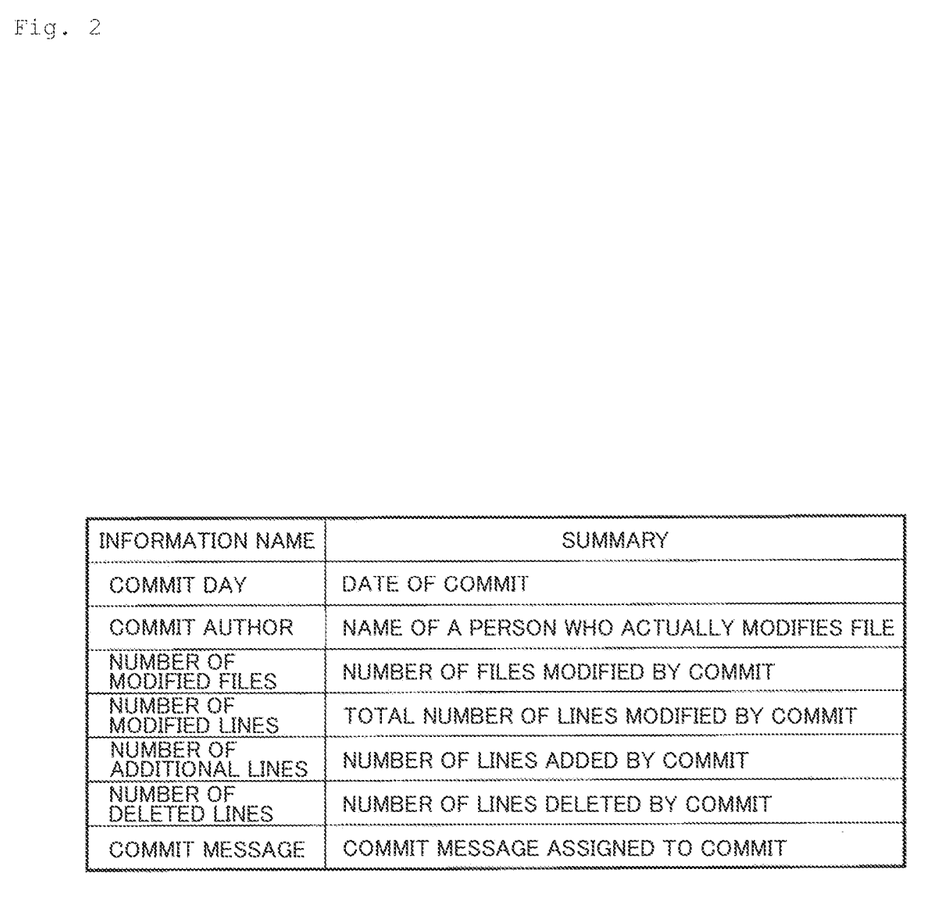
FIG. 2 is a diagram illustrating an example of a commit history.

FIG. 2 illustrates an example of the commit history acquired by the acquisition unit 11. The commit history is recorded in a commit unit. FIG. 2 illustrates an example of a commit history recorded in one commit. The commit history illustrated in FIG. 2 includes a commit date, a commit author, the number of modified files, the number of modified lines, the number of additional lines, the number of deleted lines, and a commit message. The commit date is the date when the file is committed. The commit author is the name of the person who executes a commit and the name of a person who actually modifies the file. The number of modified files is the number of files modified by the commit. The number of modified lines is the total number of lines modified by the commit, and is a value obtained by summing the number of additional lines and the number of deleted lines. The number of additional lines is the number of lines added by the commit. The number of deleted lines is the number of lines deleted by the commit. The commit message is a message given to the commit. The commit history may include other information.

Figure 3:
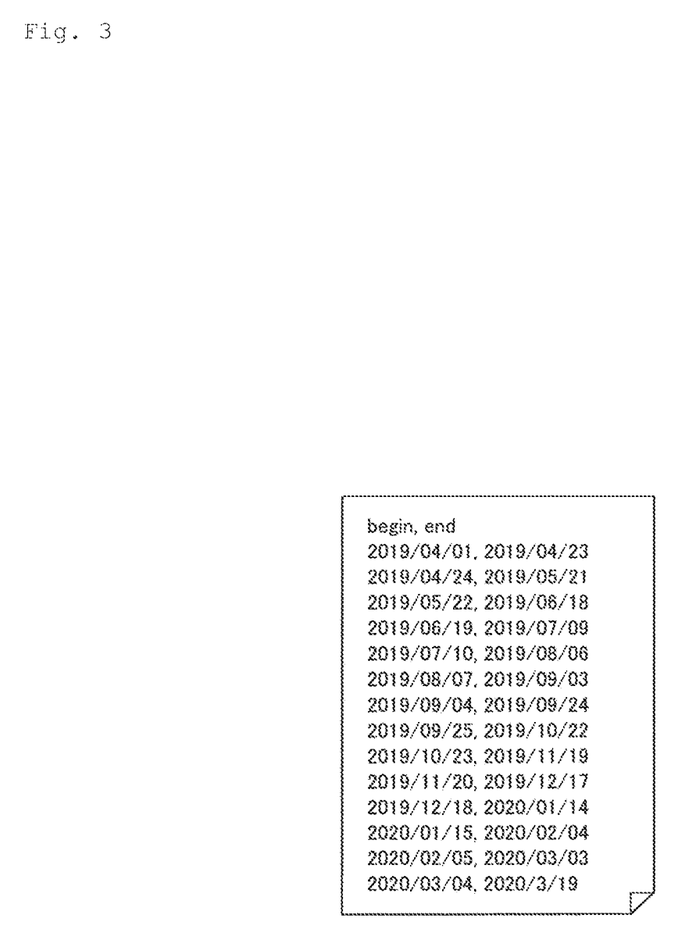
FIG. 3 is a diagram illustrating an example of a sprint period.

The analysis unit 12 calculates statistical information by aggregating the commit history in units of repeated sprint periods. As illustrated in FIG. 3, for example, a start date and an end date are given to the sprint period. The analysis unit 12 aggregates the commit history for each sprint period indicated by the start date and the end date. Examples of the statistical information obtained by the analysis unit 12 include, for example, a Gini coefficient for each sprint, the number of commit lines for each sprint, the histogram of the number of commit lines, the Lorentz curve and the like. It should be noted that the statistical information obtained by the analysis unit 12 is not limited to these.

Figure 4A:
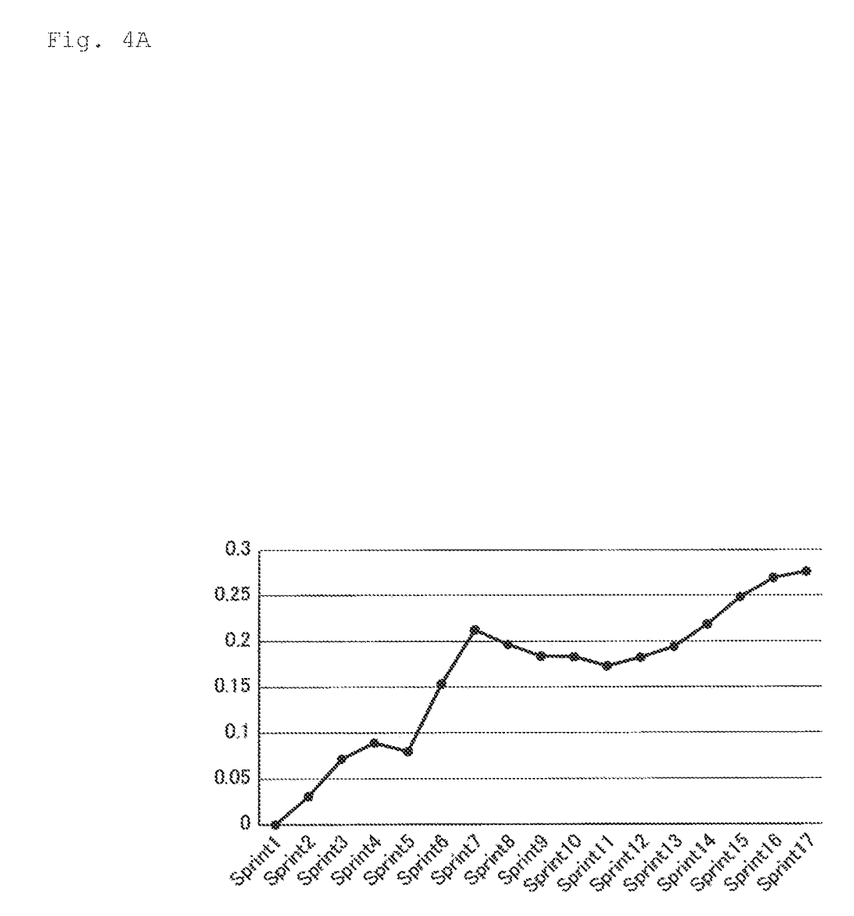
FIG. 4A is a display example of the Gini coefficient for each sprint.
Figure 4B:
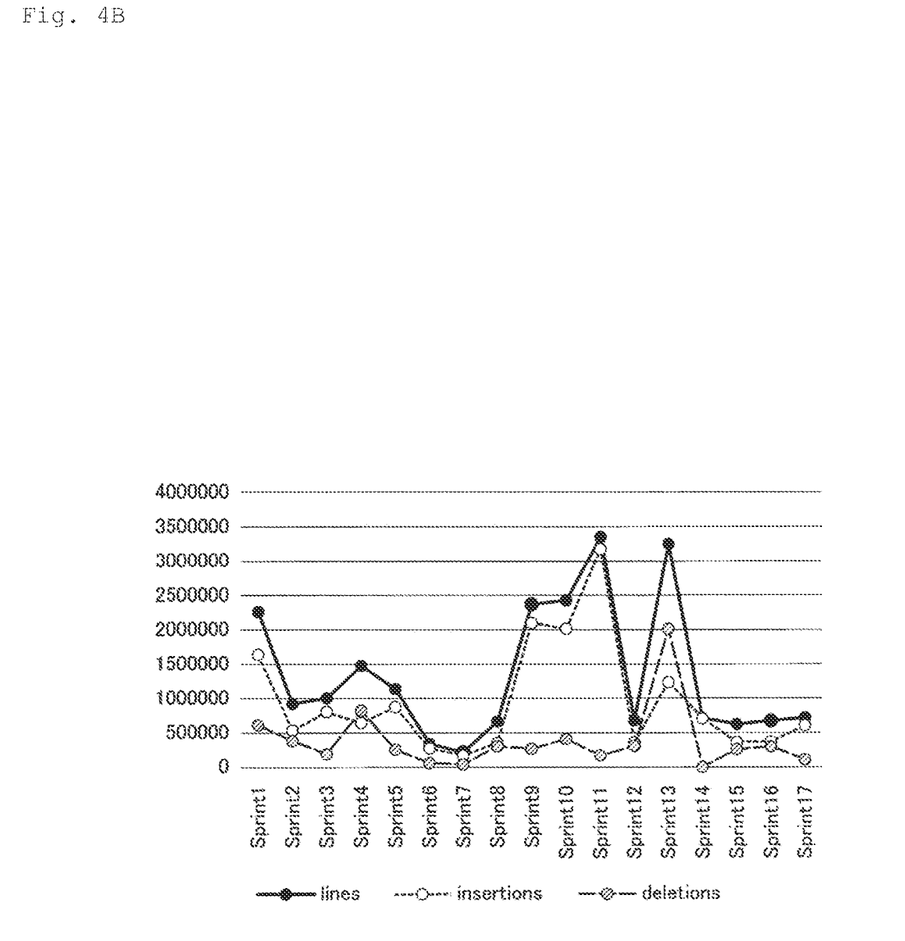
FIG. 4B is a display example of the number of commit lines for each sprint.
Figure 4C:
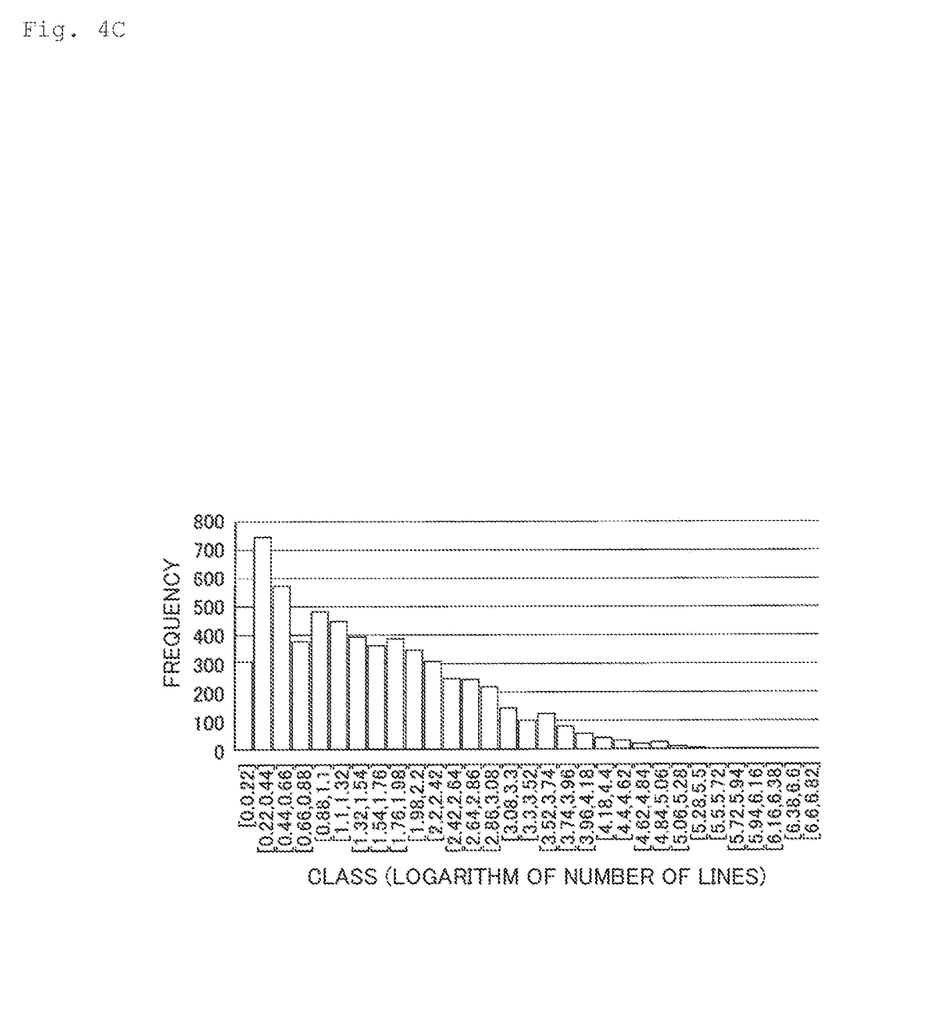
FIG. 4C is a display example of a logarithmic histogram of the number of commit lines.
Figure 4D:
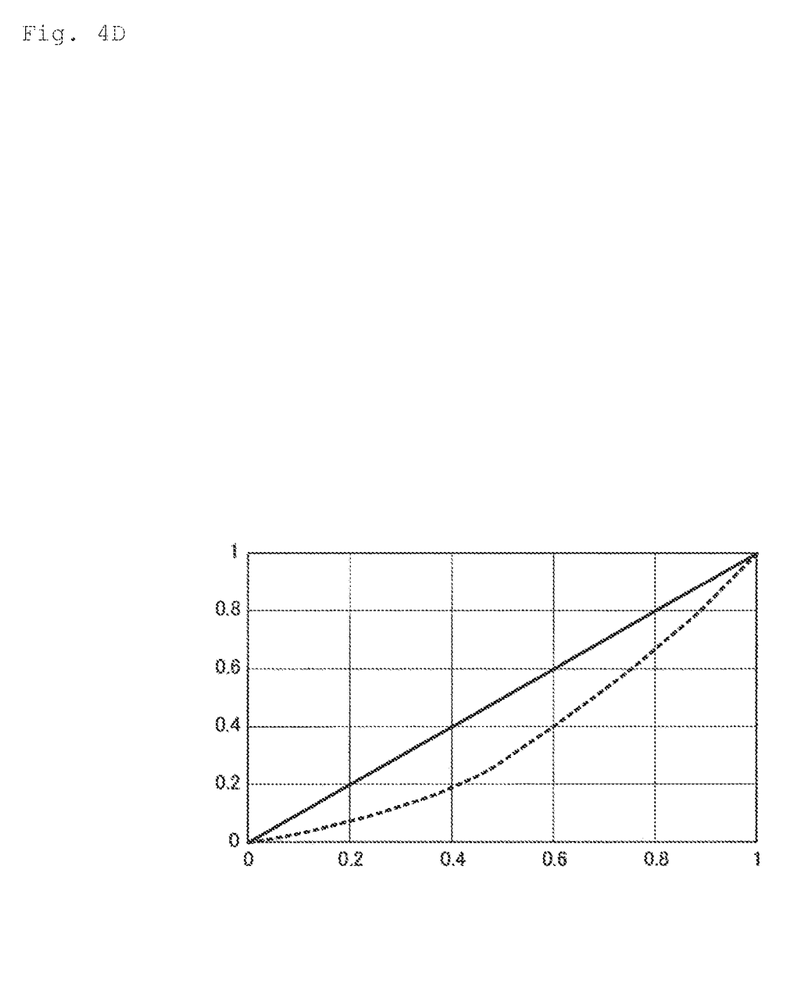
FIG. 4D is a display example of the Lorentz curve.

The display unit 13 visualizes the statistical information calculated by the analysis unit 12. FIGS. 4A to 4D illustrate an example of the visualized and displayed statistical information. FIG. 4A illustrates an example of a display of the Gini coefficient for each sprint. FIG. 4B illustrates an example of display of the number of commit lines for each sprint. FIG. 4C is a display example of a logarithmic histogram of the number of commit lines. FIG. 4D is a display example of the Lorentz curve.

Next, an operation of the analyzing device 1 in the present embodiment will be described.

Figure 5:
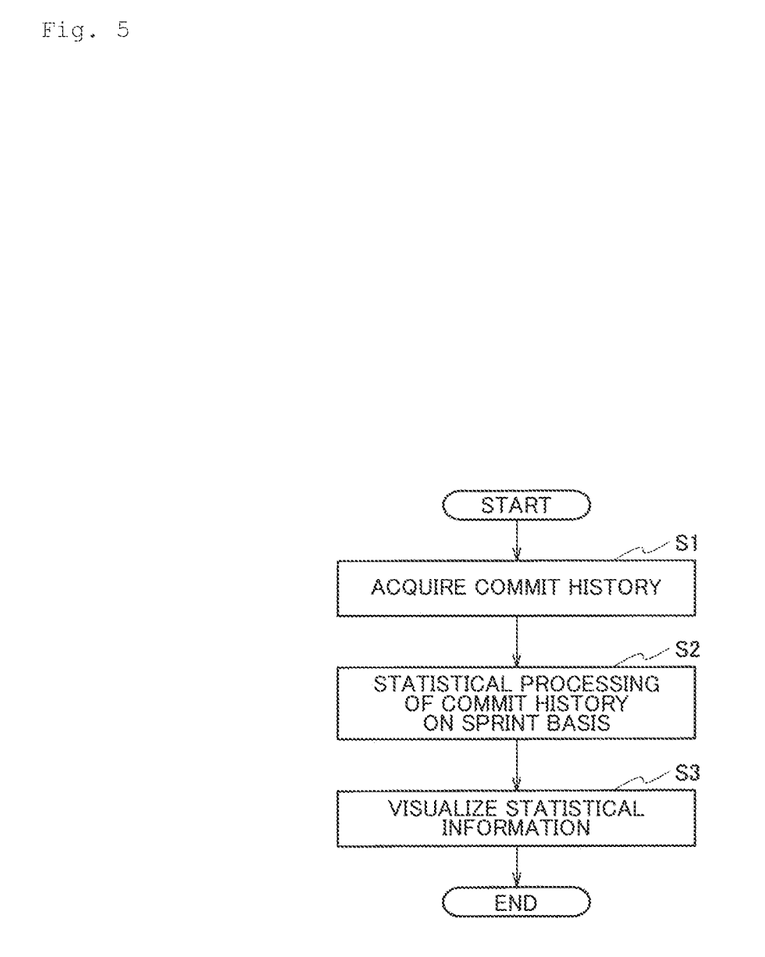
FIG. 5 is a flowchart for illustrating an example of a processing flow by the analyzing device.

FIG. 5 is a flowchart for illustrating an example of a processing flow of the analyzing device 1 of the present embodiment. The processing of FIG. 5 is executed at a predetermined timing, for example, every time the sprint is completed.

In a step S1, the acquisition unit 11 acquires a commit history from the development repository 2. The acquisition unit 11 may exclude a specific commit history or correct notation fluctuation of a name of a commit author of the commit history. The details of the preprocessing by the acquisition unit 11 will be described later.

In a step S2, the analysis unit 12 aggregates the commit history in the units of the sprint period to calculate statistical information. An example of calculating the Gini coefficient as the statistical information will be described later.

In a step S3, the display unit 13 visualizes and displays the statistical information. A user (for example, a development team) operates the analyzing device 1, selects statistical information to be displayed, and selects a display mode.

Through the above processing, the user can quantitatively compare the sprints and objectively measure the productivity and stability of the development team in agile software development.

Next, an example in which the Gini coefficient is used as statistical information will be described.

The Gini coefficient is an index for measuring income, maldistribution of enrichment, inequality in energy consumption, and the like. In the present embodiment, a history indicating a result in software development such as the number of commit lines, the number of commits, or the number of files is aggregated as a key, and the Gini coefficient in which the maldistribution of the result in software development until a certain sprinting is considered in a sprinting unit is calculated, and the maldistribution of results software development is quantitatively visualized.

The Gini coefficient is defined as a ratio of an area of a region surrounded by the Lorentz curve and the uniform distribution wiring to an area below the uniform distribution wiring. The uniform distribution wiring is the Lorentz curve in a case where the distribution of the results is uniform. The Gini coefficient can be expressed by the following equation using the integration of the Lorentz curve L(F).

[Math. 1]

$$Gini = \frac{\frac{1}{2} - \int_0^1 L(F)df}{\frac{1}{2}} = 1 - 2\int_0^1 L(F)df$$

The range of values taken by the Gini coefficient is evaluated to be 0 to 1, and it is evaluated that the larger the value, the larger the disparity in the group.

Figure 6:
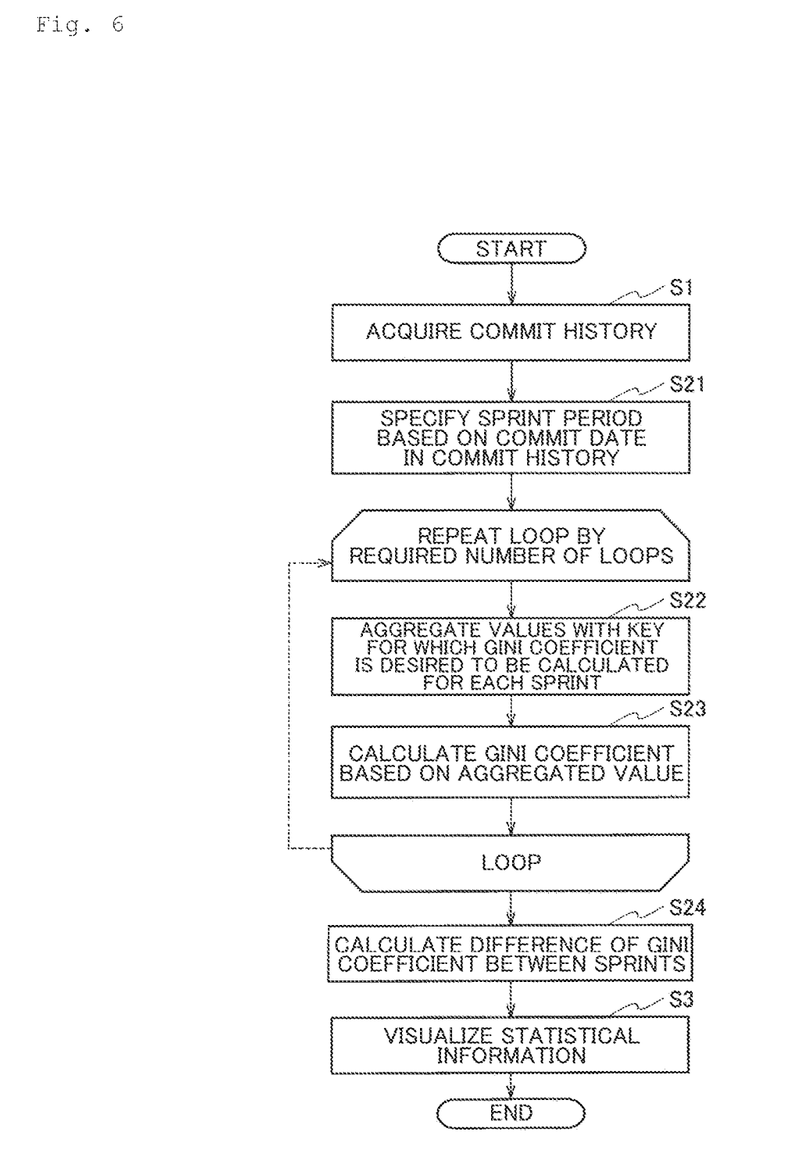
FIG. 6 is a flowchart illustrating an example of a processing flow of the analyzing device that calculates the Gini coefficient as statistical information.

Referring to the flowchart of FIG. 6, the flow of processing for calculating the Gini coefficient as the statistical information will be described.

In the step S1, the acquisition unit 11 acquires a commit history from the development repository 2.

In a step S21, the analysis unit 12 specifies a sprint including the commit history based on the commit date of the commit history.

In a step S22, the analysis unit 12 aggregates the values of the keys for which the Gini coefficient is desired to be calculated for each sprint. For example, when the number of commit lines is used as a key, the number of lines of a sprint 1, the number of lines of a sprint 2, . . . , and the number of lines of the sprint X are obtained. The number of commit lines is one example and is not limited thereto. Data which can be acquired from the commit history such as the number of files and the number of commits can be used as a key.

In a step S23, the analysis unit 12 calculates the Gini coefficient based on the aggregated value. When the numerical value of the group to be analyzed is expressed as x={x1, x2, ..., xn}, the Gini coefficient of sprint n can be calculated by the following equations.

[Math. 2]

$$MD = \frac{1}{n^2} \sum_{i=1}^{n} \sum_{j=1}^{n} |x_i - x_j| \quad (1)$$

$$AM = \frac{1}{n} \sum_{i=1}^{n} x_i \quad (2)$$

$$\text{gini coefficient} = \frac{MD}{2AM} \quad (3)$$

The analysis unit 12 repeats the step S22 and the step S23 as much as necessary. For example, in a case where the software development is performed up to the sprint X, the steps S22 and S23 are repeated to calculate the Gini coefficient from the sprint 1 to the sprint X.

In a step S24, the analysis unit 12 calculates the difference in the Gini coefficient between the sprints. In a case where the difference is within the fixed range, it can be determined that the equivalent product can be stably created. In a case where the difference is increased to a certain value or more, there is a possibility that a load is applied to the development team. In a case where the difference is reduced to a certain value or more, there is a possibility that a problem of achievement creation occurs in a development team.

In the step S3, the display unit 13 visualizes and displays the statistical information.

Figure 7:
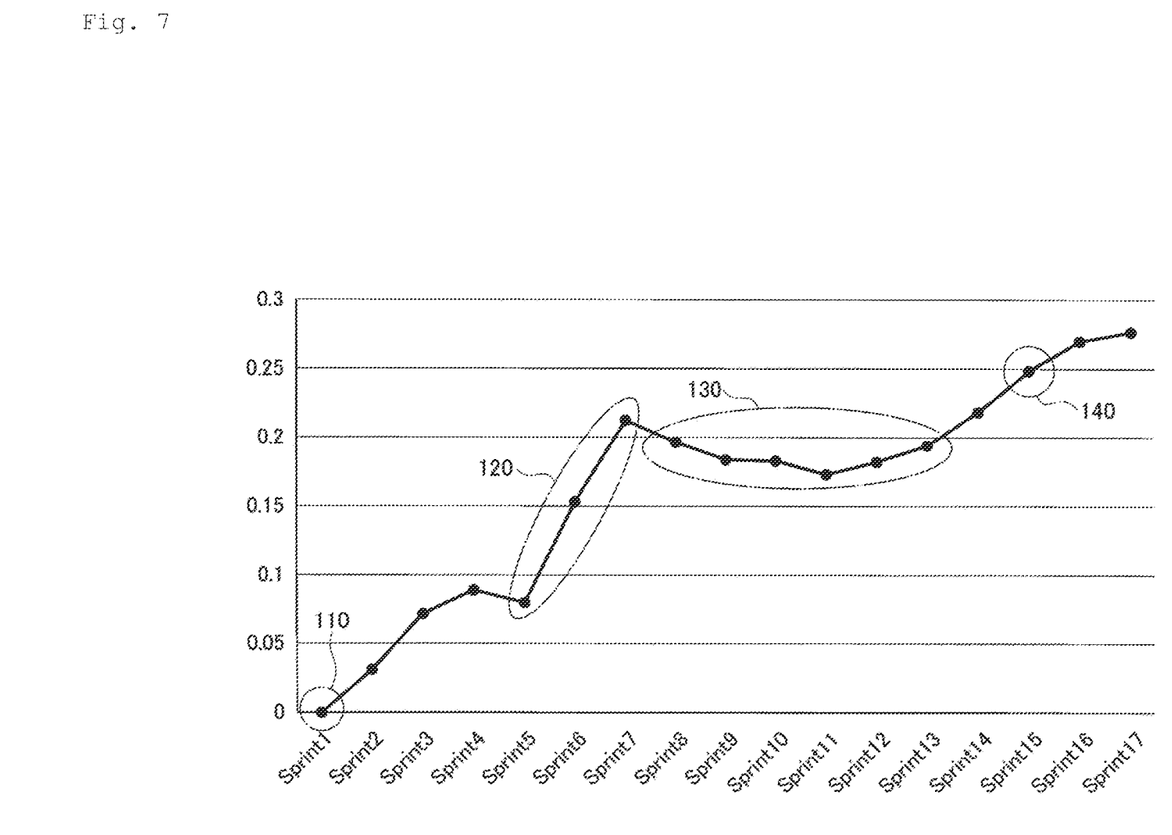
FIG. 7 is a display example of the Gini coefficient for each sprint.

FIG. 7 illustrates a display example of the Gini coefficient for each of the sprints. Since only the data of the sprint 1 is used for the calculation of the Gini coefficient in the sprint 1 indicated by the reference numeral 110, the Gini coefficient is not unevenly distributed to 0 (No maldistribution). In the section up to the sprint 7 indicated by the reference numeral 120, since the Gini coefficient is increased, it is considered that a large amount of product is created. It can be found that the section from the sprint 8 to the sprint 14 indicated by reference numeral 130 has the stable Gini coefficient and creates a constant result. From the sprint 15 indicated by reference numeral 140, the Gini coefficient is increased again.

Next, the preprocessing performed before analyzing the commit history will be described.

As preprocessing of the commit history, the acquisition unit 11 may exclude the commit history matching the exclusion condition.

Automatic commit by a continuous integration (CI) tool may be added during the sprint. In this case, the commit histories other than commit histories indicating results by the development team are mixed in the commit histories acquired the acquisition unit 11, and the measurement of stability as the development team is affected. Then, the acquisition unit 11 excludes a commit history in which a character "auto" is included in the commit message, for example. Thus, the commit history of the automatic commit by the CI can be excluded from the processing object.

Figure 8:
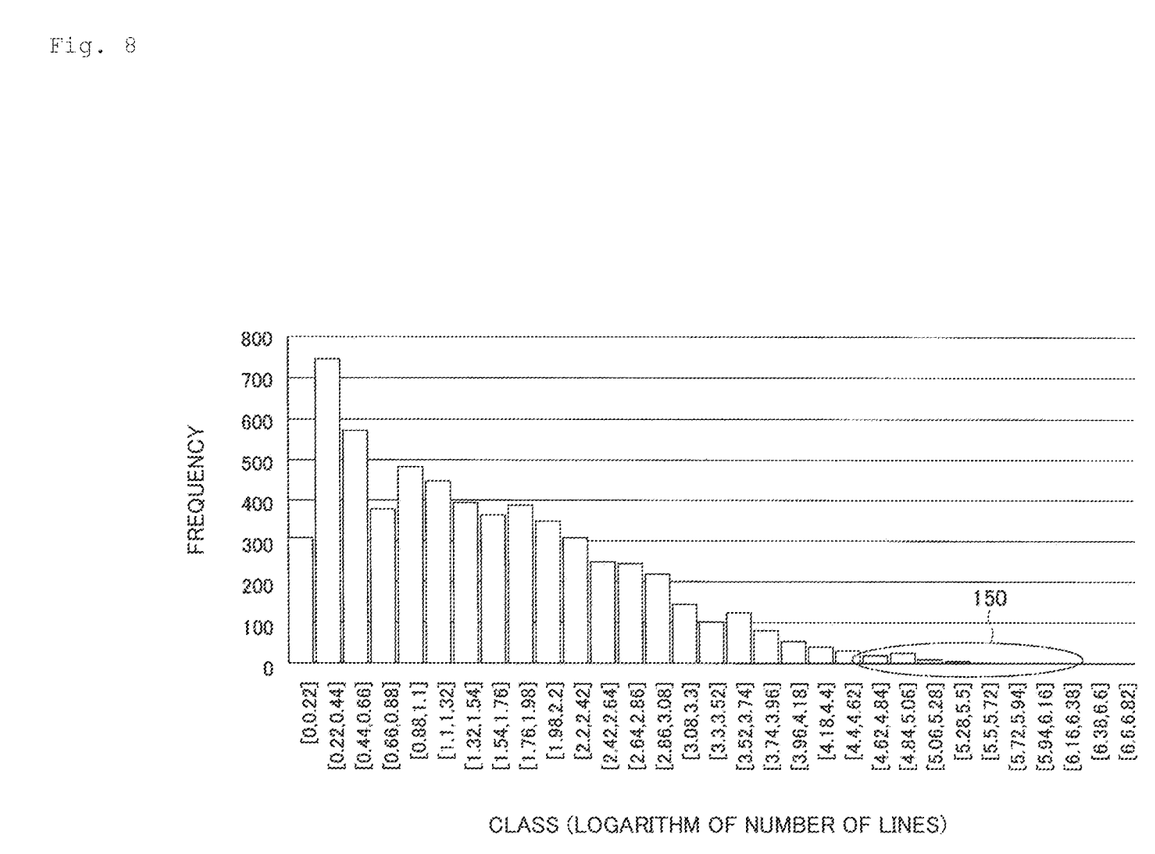
FIG. 8 is a display example of a logarithmic histogram of the number of commit lines.

As another example, the portion indicated by reference numeral 150 in the logarithmic histogram of FIG. 8 is considered to be an obstacle to analysis because a large number of lines are executed by one commit. In FIG. 8, the horizontal axis is log 10 of the number of modified lines. Therefore, for example, in the class where the horizontal axis in reference numeral 150 is 5, the 5th row of 10 (100,000) is modified by one commit. Therefore, the acquisition unit 11 excludes the commit history in which the number of modified lines in one commit is too large. Thus, the commit history considered to be abnormal commit can be excluded from the processing object.

Thus, by excluding the commit history matching the exclusion condition from the analysis object as preprocessing, the stability of the development team can be objectively measured.

As preprocessing of the commit history, the acquisition unit 11 may correct notation fluctuation of a name of a commit author of the commit history.

For example, in a Git widely used as a version management system, the name of a commit can be arbitrarily set. In a case where a person in charge of development is developing using multiple development environments (for example, desktop and server), there is a possibility that the notation fluctuation of the name occurs for each development environment. In a case where the analysis unit 12 aggregates statistical information for each person in charge of development, if the notation fluctuation of the name occurs, analysis of the commit history is affected.

Then, the acquisition unit 11 converts the commit author of the commit history to correct the notation fluctuation. For example, the commit author is extracted from the commit history, and a correct/incorrect table after conversion before conversion of the commit author is created for the same person including a plurality of commit authors. The acquisition unit 11 mechanically converts the name of the commit author by using the correct/incorrect table.

Alternatively, a list of names of persons in charge of development existing in the development team is created. The acquisition unit 11 calculates a standardized Labenchtine distance between the names described in the list and the names of the commit authors, and converts the name into a name in which the calculated standardized Labenchtine distance is smaller than a threshold value and becomes the minimum. The acquisition unit 11 may calculate a Jaro-winkler distance between the names described in the list and the names of the commit authors, and convert the name into a name in which the calculated Jaro-winkler distance is larger than a threshold and becomes the maximum. The method of correcting the notation fluctuation is not limited to the above.

As described above, the analyzing device 1 of the present embodiment is an analyzing device for analyzing a result of a software development team that repeatedly executes a sprint and includes the acquisition unit 11 that acquires a commit history from the development repository 2 that stores a product of the software development team, the analysis unit 12 that calculates statistical information by aggregating the commit histories in units of the sprint, and the display unit 13 that displays the statistical information. In addition, the analysis unit 12 calculates the Gini coefficient in which the maldistribution of the result of the software development team is considered in the unit of the sprint. Thus, the maldistribution of the continuous result creation can be quantitatively visualized, and the productivity and stability in the development team can be objectively evaluated. As a result, efficient management of the agile development can be performed.

Figure 9:
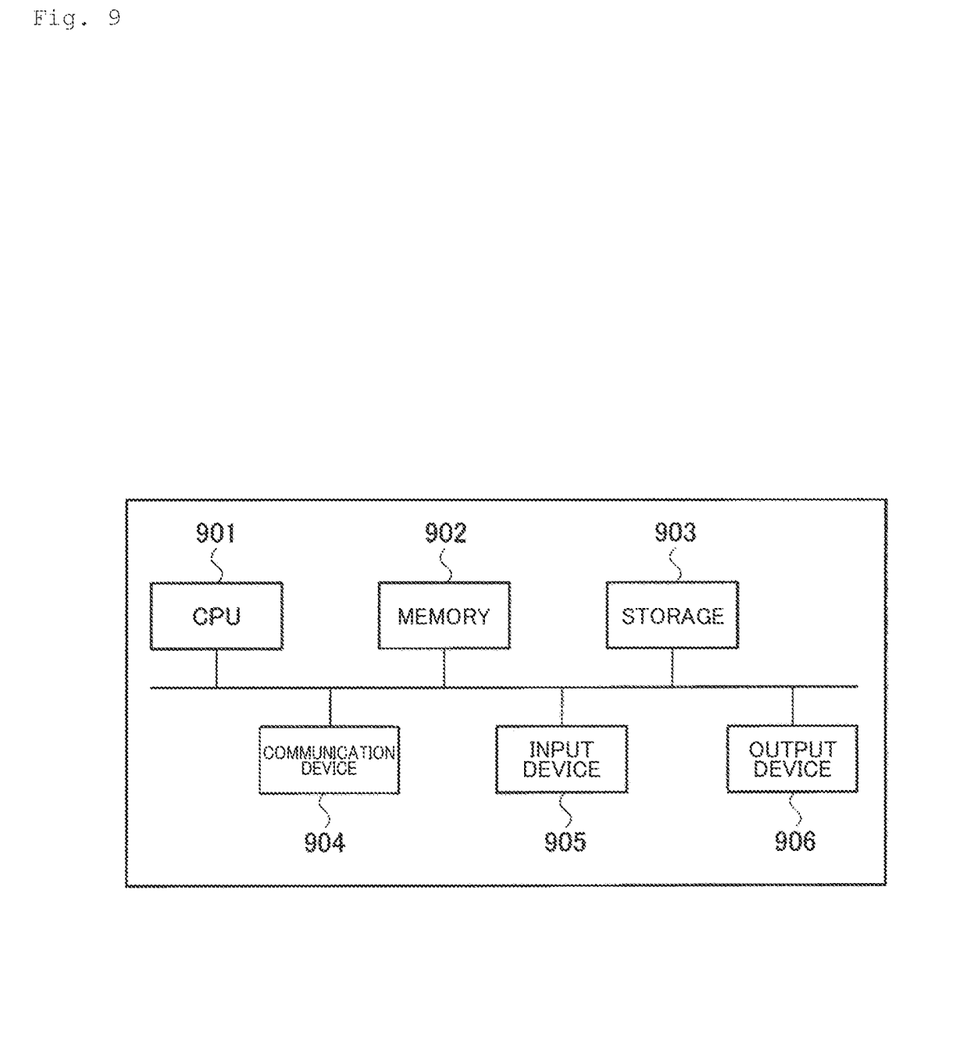
FIG. 9 is a diagram illustrating an example of a hardware configuration of the analyzing device.

The analyzing device 1 described above can use, for example, a general-purpose computer system including a central processing unit (CPU) 901, a memory 902, a storage 903, a communication device 904, an input device 905, and an output device 906 as illustrated in FIG. 9. In the computer system, the analyzing device 1 is implemented as the CPU 901 executes a prescribed program loaded on the memory 902. The program can be recorded on a computer-readable recording medium such as a magnetic disk, as optical disc, or a semiconductor memory and can also be distributed via a network.

REFERENCE SIGNS LIST

1 Analyzing device
11 Acquisition unit
12 Analysis unit
13 Display unit

The invention claimed is:

1. An analyzing device for analyzing a result of a software development team that is configured to repeatedly execute a development cycle, the device comprising:
a processor; and
a memory device storing instructions that, when executed by the processor, configure the processor to:
acquire a commit history from a development repository that stores a product of the software development team;
correct a notation fluctuation of a name of a commit author of the commit history, wherein the commit history includes a number of commit lines, a number of commits, and a number of files;
aggregate the number of commit lines, the number of commits, and the number of files as values of keys;
calculate, using the aggregated values of keys, statistical information comprising a Gini coefficient for each of sprint periods by aggregating the commit histories in the sprint periods;
display the statistical information comprising Gini coefficients in the sprint periods; and
examine the displayed Gini coefficients, wherein a difference between the Gini coefficients being within a predetermined range indicates that an equivalent product is stably created.

2. The analyzing device according to claim 1, wherein the processor is further configured to:
exclude the commit history comprising an automatic commit performed by a continuous integration (CI) tool.

3. The analyzing device according to claim 1, wherein the processor is further configured to exclude the commit history comprising a commit having a number of modified lines larger than a threshold value.

4. The analyzing device according to claim 1, wherein to correct the notation fluctuation of the name of the commit author, the processor is further configured to:
provide a list of names of each person in the software development team;
determine a Labenchtine distance between each name in the list and the name of a commit author; and
convert the name of a commit author to one of the list of names having the minimum Labenchtine distance.

5. The analyzing device according to claim 1, wherein to correct the notation fluctuation of the name of the commit author, the processor is further configured to:
provide a list of names of each person in the software development team;
determine a Jaro-winkler distance between each name in the list and the name of a commit author; and
convert the name of a commit author to one of the list of names having the maximum Jaro-winkler distance.

6. An analyzing method for analyzing a result of a software development team that is configured to repeatedly execute a development cycle, the method causing a computer to execute operations comprising:
acquiring a commit history from a development repository that stores a product of the software development team;
correcting a notation fluctuation of a name of a commit author of the commit history, wherein the commit history includes a number of commit lines, a number of commits, and a number of files;
aggregating the number of commit lines, the number of commits, and the number of files as values of keys;
calculating, using the aggregated values of keys, statistical information comprising a Gini coefficient for each of sprint periods by aggregating the commit histories in the sprint periods;
displaying the statistical information comprising Gini coefficients in the sprint periods; and
examining the displayed Gini coefficients, wherein a difference between the Gini coefficients being within a predetermined range indicates that an equivalent product is stably created.

7. A non-transitory computer readable medium storing a program, wherein executing of the program causes a computer to perform operations comprising:
acquiring a commit history from a development repository that stores a product of a software development team;
correcting a notation fluctuation of a name of a commit author of the commit history, wherein the commit history includes a number of commit lines, a number of commits, and a number of files;
aggregating the number of commit lines, the number of commits, and the number of files as values of keys;
calculating, using the aggregated values of keys, statistical information comprising a Gini coefficient for each of sprint periods by aggregating the commit histories in the sprint periods;
displaying the statistical information comprising Gini coefficients in the sprint periods; and
examining the displayed Gini coefficients, wherein a difference between the Gini coefficients being within a predetermined range indicates that an equivalent product is stably created.

8. The non-transitory computer readable medium according to claim 7, the operations further comprising excluding the commit history comprising an automatic commit performed by a continuous integration (CI) tool.

9. The non-transitory computer readable medium according to claim 7, the operations further comprising excluding the commit history comprising a commit having a number of modified lines larger than a threshold value.

* * * * *